May 9, 1933.  G. LYNN  1,907,987
SODA ASH
Filed Sept. 8, 1930
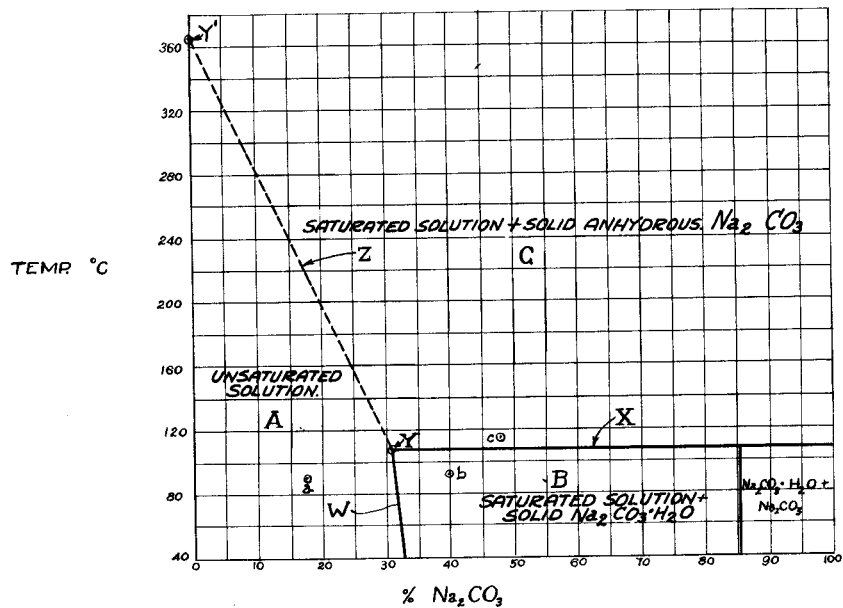
INVENTOR
GEORGE LYNN
BY Brockett, Hyde, Higley & Meyer
ATTORNEYS Patented May 9, 1933

1,907,987

UNITED STATES PATENT OFFICE

GEORGE LYNN, OF WADSWORTH, OHIO, ASSIGNOR TO PITTSBURGH PLATE GLASS COMPANY, OF PITTSBURGH, PENNSYLVANIA, A CORPORATION OF PENNSYLVANIA

SODA ASH

Application filed September 8, 1930. Serial No. 480,412.

This invention relates to the production of dense anhydrous soda ash, its object being to provide an improved method of production which may be carried out in standard apparatus and at low cost; which produces an improved product having greater density and improved free running flow characteristics as compared with prior dense ash; and which method also offers very convenient possibilities in the way of securing a high degree of purity and has other advantages, as will appear.

In the drawing the view is a diagram representing conditions for the formation of different forms of sodium carbonate.

High density is a desirable quality of soda ash, as of many other industrial materials, on account of the reduced bulk to be shipped and stored, but with soda ash there are more important reasons for reduction in bulk, particularly when the material is used in certain industries. For example, when used as an ingredient for the mix in the manufacture of glass, increase in density correspondingly increases the yield in glass for each pot full of mix, and the desire, of course, is to make each pot yield the maximum at each heat.

The ammonia soda process produces sodium bicarbonate, or bicarb, in the form of small crystals. This material usually is heated in some form of externally fired drier, such as a Thielen pan or rotary drier, in which the material is agitated while heat is applied to the outside of the vessel. The result is to drive off the $H_2O$ and $CO_2$, leaving a dry anhydrous material called "light ash" and having a density of about 30 pounds per cu. ft. Its chemical composition is commercially pure $Na_2CO_3$ and it is likely that in physical form its particles have the shape of the original crystals of $NaHCO_3$, but they are more or less porous or open shells, husks or skeletons of the original crystals, the cavities being due to driving out the $H_2O$ and $CO_2$. This "light ash" customarily is next treated to form dense ash in one or the other of two ways.

(a) Water dense ash is made by adding to the light ash about 15% (approximately the molar amount) of $H_2O$ to produce $Na_2CO_3 \cdot H_2O$. The hot mixture is merely stirred in an open vessel and it is probable that the shells or husks of the original $NaHCO_3$ crystals disappear and new crystals of $Na_2CO_3 \cdot H_2O$ are formed. The product is dried in a suitable externally fired drier which drives off the $H_2O$, leaving anhydrous $Na_2CO_3$ with the particles having the physical form of open or porous husks or shells of the former crystals of $Na_2CO_3 \cdot H_2O$. Nevertheless, this material is commonly made with a density of about 60 pounds per cu. ft.

(b) Fire dense ash is made by heating the light ash in an internally fired drier where the flames have direct contact with the material. The effect apparently is an incipient fusion which physically compacts the grains or particles. In any event the composition again is anhydrous $Na_2CO_3$ and the density is about 60 pounds per cu. ft.

According to my method advantage is taken of the fact that when $Na_2CO_3$ is dissolved in water the solid product which crystallizes or deposits upon evaporation depends upon both temperature and degree of concentration. Investigation has shown that such a solution behaves approximately according to the chart in the accompanying drawing, on which the several lines or field boundaries are plotted in illustrative form rather than from the standpoint of technical accuracy. In the chart vertical distances represent temperatures centigrade and horizontal distances represent degree of concentration, or in other words the percentage of sodium carbonate in the mixture under consideration. It will be observed that in area A the mixture is entirely a solution or in liquid form. In other words, at the temperature and degree of concentration represented by the abscissa and ordinate at any point, as $a$, in area A, the mixture of $Na_2CO_3$ and $H_2O$ is a complete unsaturated solution. In area B a mixture under conditions represented by any point, as $b$, contains both a saturated solution of $Na_2CO_3$ and also some crystalline $Na_2CO_3 \cdot H_2O$. In area C, with which we are mostly concerned, a mixture under conditions represented by any point, as $c$, contains both a saturated solution of $Na_2CO_3$ and also crystalline anhydrous $Na_2CO_3$. The line X or boundary between areas B and C is substantially horizontal and lies at the "transition point", i. e., the temperature at which both anhydrous ash, $Na_2CO_3$, and the monohydrate, $Na_2CO_3 \cdot H_2O$, are in equilibrium with saturated solution. This line X terminates at the point Y, which represents the composition of the solution saturated with respect to both anhydrous ash, $Na_2CO_3$, and the monohydrate $Na_2CO_3 \cdot H_2O$, at their transition temperature and pressure. This line X, experience and investigation show, is located at a temperature of about 107° C. The line Z or boundary between areas A and C, at the various temperatures indicated, represents the concentration of $Na_2CO_3$ in a solution saturated with respect to anhydrous $Na_2CO_3$, or, in other words, is the saturation line. It is more or less curved, although conventionally represented in the drawing by a straight line, and extends from point Y to a point Y' on the vertical axis at the critical temperature of water, about 365° C. Likewise, the line W. between areas A and B, represents, at the various temperatures indicated by said line, the concentration of $Na_2CO_3$ in a solution saturated with respect to the monohydrate, and is likewise a saturation line.

This chart, verified as it is by technical investigation, shows that if any mixture of $Na_2CO_3$ and $H_2O$ is suitably treated, either by changing its temperature or by producing evaporation, to bring it to conditions represented by any point in area C, and assuming the lapse of sufficient time to secure stable conditions, the mixture will consist of a solution of $Na_2CO_3$ in $H_2O$ accompanied by a certain amount of solid anhydrous $Na_2CO_3$. The necessary conditions are that the temperature must be above the transition temperature, approximately 107° C., and at any such temperature the degree of concentration of $Na_2CO_3$ in the mixture must be greater than the concentration value where the line Z crosses the existing temperature line. From such a mixture the solid anhydrous $Na_2CO_3$ may be readily separated in any convenient or suitable manner, such as by filtration, by centrifugal action, by decantation or otherwise, with the precaution of securing proper separation before the material has opportunity to change to one of the other forms of solid soda ash, such as the monohydrate $Na_2CO_3 \cdot H_2O$, or the polyhydrates, $$Na_2CO_3 \cdot 7H_2O \text{ or } Na_2CO_3 \cdot 10H_2O.$$

However, the change from $$Na_2CO_3 \text{ to } Na_2CO_3 \cdot H_2O$$

requires some little time, so that when the anhydrous $Na_2CO_3$ is actually produced in stable solid form in the manner stated, a quick filtration or other mechanical separation and prompt drying where desired are satisfactory, even though the temperature falls below the transition point.

As illustrations of the present method two examples may be given.

Method 1 consists in first forming a mixture of $Na_2CO_3$ with sufficient water for complete solution and then so manipulating said solution as to create the conditions necessary for the formation of solid anhydrous $Na_2CO_3$. Two schemes of treatment are possible. If the temperature is already above the transition temperature and is so maintained, evaporation of the mixture may be caused or permitted until degree of concentration crosses the line Z on the chart, after which continued evaporation even to the point of dryness increases more and more the formation of crystals of solid anhydrous $Na_2CO_3$. Again, the degree of concentration, whatever it is, may be maintained and the temperature may be raised until the transition temperature is exceeded by crossing the line X, if the concentration is greater than about 32% to 35%, or, if the concentration is less, than about 32% to 35%, the line Z may be crossed, in either case reaching conditions under which precipitation or crystallization of solid anhydrous $Na_2CO_3$ occurs. Or, the two schemes may be combined and both the degree of concentration and the temperature may be increased until conditions within the area C are reached.

When the ammonia soda process is utilized for the production of bicarb, the bicarb is converted to light ash in an externally fired drier, as has been the custom in the past. This drives off both $H_2O$ and $CO_2$. The light ash is now fully dissolved in water, making sure to use water in slight excess rather than too little. Formation of the resulting solution provides the best possible opportunity for purification by the removal of insolubles, such as $CaCO_3$, Fe compounds, MgO, etc., all of which may be removed from the solution by filtration, decantation or the like.

The clean solution or filtrate is now evaporated in any suitable evaporator in which pressures above atmospheric may be produced and maintained, because ultimately the temperature must be carried above the transition point, about 107° C., and there be maintained until evaporation has proceeded to the required degree. In practice it is found that good results may be secured at temperatures of from 110° C. to 120° C. and at corresponding pressures of from 3 to 10 pounds above atmospheric. Naturally temperatures just above the transition point are preferable to the higher temperatures, by reason of the avoidance of the higher pressures that must accompany higher temperatures. During the process, the temperature is caused to rise, before any precipitation or crystallization has occurred, to a value reasonably above the transition point, such as to the temperatures indicated, and then approximately isothermal evaporation is allowed to proceed to any degree, even to dryness. However, the principle of fractional crystallization permits of further purification for the removal of certain foreign solubles, such as NaCl. The anhydrous $Na_2CO_3$ is the first material to crystallize or deposit and by stopping evaporation short of dryness, quickly separating the solid anhydrous $Na_2CO_3$ by filtration or otherwise, and bleeding off a part of the mother liquor, good separation of these foreign solubles may be effected, with consequent very pure product.

Method 2 consists in the direct formation of a slurry consisting of a mixture of $Na_2CO_3 \cdot H_2O$ crystals and saturated solution, with a composition corresponding to some suitable point in field B. This may be done, for example, by agitating light ash with hot water in a greater amount than that required to just form monohydrate. The slurry is then heated, preferably with agitation, to a temperature above the transition point, which causes it to cross the line X into the field C. Pressure above atmospheric, of course, is necessary at this point, for the same reasons stated in Method 1 above. Here the slurry is agitated for a sufficient time to change all of the monohydrate crystals by transition into anhydrous crystals, which can then be further handled in the same manner as in Method 1. If desired, the filtrate from the anhydrous crystals can be used instead of water, in making up a new batch of $Na_2CO_3 \cdot H_2O$ slurry. Thus the liquor goes through a cyclical process and a sufficient amount may be bled from the cycle to complete the separation of such impurities as NaCl, for example, below their crystallization point, with consequent tendency toward higher purity in the product.

According to both methods the anhydrous crystals are mechanically separated from the liquor and usually require final drying. Of course, just as with the separation of the crystals from the mother liquor, ideal drying would be carried out above the transition temperature, but in practice it may occur at somewhat lower temperatures, if carried out rapidly, without material transition of the crystals to other forms.

The resulting anhydrous $Na_2CO_3$ is in crystalline form, with primary crystals of the anhydrous material itself, instead of husks or shells of the crystals of an earlier stage material, such as $NaHCO_3$ or $Na_2CO_3 \cdot H_2O$. Therefore the product is unusually dense, reaching a density as high as 75–80 pounds per cu. ft., and is consequently of appreciably greater value.

Moreover, the new material has a greatly improved flow characteristic as compared with prior forms of soda ash, either light or dense, by which I refer to its ability or readiness to flow or slide or assume an angle of repose when stored in a pile, bin or the like.

Furthermore, by this method the particle-size of the resulting dense ash can be controlled over a much wider range than heretofore, which is a decided advantage for certain uses.

It will of course be understood that mechanical separation of the crystallized anhydrous $Na_2CO_3$ may be performed under pressure and at a temperature above the transition point, but as before stated, this is not essential and separation may occur or be completed even after the temperature has fallen below the transition point, so long as the step of separation is not unduly delayed. Sufficient delay for practical purposes is entirely feasible and within the scope of my invention.

What I claim is:

1. The method of forming dense soda ash, consisting in treating a mixture of soda ash and water to bring it to a temperature above the transition temperature between $Na_2CO_3 \cdot H_2O$ and anhydrous $Na_2CO_3$ while subjecting it to the increase of pressure above atmospheric necessary at such temperatures and to a degree of concentration sufficient to cause deposition of solid material, thereby producing and depositing solid anhydrous $Na_2CO_3$, and separating the same from the mixture.

2. The method of forming dense soda ash, consisting in raising the temperature of a properly concentrated mixture of $Na_2CO_3$ and $H_2O$ to a value above the transition temperature between $Na_2CO_3 \cdot H_2O$ and anhydrous $Na_2CO_3$ while subjecting it to the increase of pressure above atmospheric necessary at such temperatures, thereby producing and depositing solid anhydrous $Na_2CO_3$, and separating the same from the mixture.

3. The method of forming dense soda ash, consisting in evaporating an unsaturated solution of $Na_2CO_3$ and water at a temperature above the transition temperature between $Na_2CO_3 \cdot H_2O$ and anhydrous $Na_2CO_3$ while subjecting it to the increase of pressure above atmospheric necessary at such temperatures until concentration rises to a degree where deposition occurs, thereby depositing solid anhydrous $Na_2CO_3$, and separating the same from the mixture.

4. The method of forming dense soda ash, consisting in dissolving light ash in water, separating insoluble material, treating the filtrate to bring it to a temperature above the transition temperature between $Na_2CO_3 \cdot H_2O$ and anhydrous $Na_2CO_3$ while subjecting it to the increase of pressure above atmospheric necessary at such temperatures and to a degree of concentration sufficient to cause deposition of solid material, thereby producing and depositing solid anhydrous $Na_2CO_3$, and separating the same from the filtrate.

5. The method of forming dense soda ash, consisting in first forming a slurry of $Na_2CO_3 \cdot H_2O$ crystals in saturated solution, raising the temperature of the slurry above the transition temperature between $Na_2CO_3 \cdot H_2O$ and anhydrous $Na_2CO_3$ while subjecting it to the increase of pressure above atmospheric necessary at such temperatures, thus causing transition of the monohydrate crystals into anhydrous $Na_2CO_3$ crystals, and separating the same from the mixture.

6. The method of forming dense soda ash, consisting in first forming a slurry of $Na_2CO_3 \cdot H_2O$ crystals in saturated solution, raising the temperature of the slurry above the transition temperature between $Na_2CO_3 \cdot H_2O$ and anhydrous $Na_2CO_3$ while subjecting it to the increase of pressure above atmospheric necessary at such temperatures, thus causing transition of the monohydrate crystals into anhydrous $Na_2CO_3$ crystals, promptly separating the same from the mixture, and drying before material transition to monohydrate occurs.

7. The method of forming dense soda ash, which consists in producing a complete solution of $Na_2CO_3$ in water, and evaporating the same at a temperature above the transition temperature between $Na_2CO_3 \cdot H_2O$ and anhydrous $Na_2CO_3$ while subjecting it to the increase of pressure above atmospheric necessary at such temperatures, to thereby deposit solid anhydrous $Na_2CO_3$.

In testimony whereof I hereby affix my signature.

GEORGE LYNN.